(12) United States Patent
Shin (10) Patent No.: US 6,351,320 B1
(45) Date of Patent: Feb. 26, 2002

(54) MEMORY-SAVING PRINTER DRIVER (75) Inventor: Helen Haekyung Shin, Fairport, NY (US)

(73) Assignee: Xerox Corporation, Stanford, CT (US)

( * ) Notice: Subject to any disclaimer, the term of this patent is extended or adjusted under 35 U.S.C. 154(b) by 0 days.

(21) Appl. No.: 09/298,435

(22) Filed: Apr. 23, 1999

Related U.S. Application Data (63) Continuation-in-part of application No. 08/961,081, filed on Oct. 30, 1997.

(51) Int. Cl.$^7$ .............................................. G06K 15/00
(52) U.S. Cl. ..................... 358/1.9; 358/1.16; 358/518
(58) Field of Search .................. 399/406, 23; 345/597; 358/1.9, 1.16, 1.17, 1.18, 1.15, 1.14, 1.13, 1.1, 1.2, 1.6, 1.8, 1.12, 518, 520, 523, 524, 500, 502, 501, 516, 517, 519; 382/167, 165, 162, 296; 347/16, 15, 5, 19, 24, 153, 43, 184, 183

(56) References Cited

U.S. PATENT DOCUMENTS

| | | | |
|---|---|---|---|
| 4,275,413 A | | 6/1981 | Sakamoto et al. ............. 358/80 |
| 4,849,774 A | | 7/1989 | Endo et al. .............. 346/140 R |
| 5,056,042 A | * | 10/1991 | Lieb .......................... 347/153 |
| 5,192,959 A | | 3/1993 | Drake et al. ............. 346/140 R |
| 5,579,446 A | * | 11/1996 | Naik et al. .................... 358/1.9 |
| 5,664,072 A | | 9/1997 | Ueda et al. ................. 395/109 |
| 5,704,021 A | * | 12/1997 | Smith et al. .................. 358/1.9 |
| 5,842,105 A | * | 11/1998 | Acquaviva ................... 399/406 |
| 5,905,490 A | * | 5/1999 | Shu et al. .................... 345/597 |
| 5,946,454 A | * | 8/1999 | Shu et al. .................... 358/1.9 |
| 6,081,343 A | * | 6/2000 | Terashita ..................... 358/1.9 |
| 6,081,344 A | * | 6/2000 | Bockman et al. .......... 358/1.16 |
| 6,157,791 A | * | 12/2000 | Haines et al. ................ 399/23 |
| 6,189,993 B1 | * | 2/2001 | Mantell ....................... 347/15 |
| 6,246,776 B1 | * | 6/2001 | Merz et al. ................. 382/296 |
| 6,325,505 B1 | * | 12/2001 | Walker ........................ 347/19 |

\* cited by examiner

*Primary Examiner*—Dov Popovici
(74) *Attorney, Agent, or Firm*—Tallam I. Ngutt (57) ABSTRACT

A memory-saving printer driver for controlling output image aspects and quality in a color printer. The memory-saving printer driver itself includes a user interface segment having a graphical display for selecting output image aspects. The graphical display includes a media type portion for selecting a desired one of a plural number "M" of different media types for printing an output image thereon, and a lookup table segment storing a plural number "N" of media-type basis color correction lookup tables for making color corrections on output images to be printed on each media type selected from the media portion. Each media-type basis color correction lookup table of the plural number "N" is mapped for making corrections on each of a plural and variable number "K" of different media types of the plural number "M" having a common hue angle, wherein "K" is one of a series of subsets of the plural number "M". The result is the plural number "N" that is less than the plural number "M", and significant savings in lookup table storage memory.

13 Claims, 5 Drawing Sheets

MEMORY-SAVING PRINTER DRIVER

This application is a continuation-in-part of application Ser. No. 08/961,081, filed Oct. 30, 1997.

FIELD OF THE INVENTION

This invention relates generally to color printing, and more particularly to a memory-saving printer driver along with a color printer and printing system including same.

BACKGROUND OF THE INVENTION

Liquid ink printers of the type frequently referred to as continuous stream or as drop-on-demand, such as piezoelectric, acoustic, phase change wax-based or thermal, have at least one printhead from which droplets of ink are directed towards a recording sheet. Within the printhead, the ink is contained in a plurality of channels. Power pulses cause the droplets of ink to be expelled as required from orifices or nozzles at the end of the channels.

In a thermal ink-jet printer, the power pulses are usually produced by resistors, each located in a respective one of the channels, which are individually addressable to heat and vaporize ink in the channels. As voltage is applied across a selected resistor, a vapor bubble grows in the associated channel and initially bulges from the channel orifice followed by collapse of the bubble. The ink within the channel then retracts and separates from the bulging ink thereby forming a droplet moving in a direction away from the channel orifice and towards the recording medium whereupon hitting the recording medium a dot or spot of ink is deposited. The channel is then refilled by capillary action, which, in turn, draws ink from a supply container of liquid ink. Operation of a thermal ink-jet printer is described in, for example, U.S. Pat. No. 4,849,774.

The ink jet printhead may be incorporated into either a carriage type printer, a partial width array type printer, or a page-width type printer. The carriage type printer typically has a relatively small printhead containing the ink channels and nozzles. The printhead can be sealingly attached to a disposable ink supply cartridge and the combined printhead and cartridge assembly is attached to a carriage which is reciprocated to print one swath of information (equal to the length of a column of nozzles), at a time, on a stationary recording medium, such as paper or a transparency. After the swath is printed, the paper is stepped a distance equal to the height of the printed swath or a portion thereof, so that the next printed swath is contiguous or overlapping therewith. This procedure is repeated until the entire page is printed. In contrast, the page width printer includes a stationary printhead having a length sufficient to print across the width or length of a sheet of recording medium at a time. The recording medium is continually moved past the page width printhead in a direction substantially normal to the printhead length and at a constant or varying speed during the printing process. A page width ink-jet printer is described, for instance, in U.S. Pat. No. 5,192,959.

Printers typically print color and/or monochrome images received from an image output device such as a personal computer, a scanner, or a workstation. The color images printed are produced by printing with several colored inks or colorants of different colors at a time. The color of the ink and amount of ink deposited by the printer is determined according to image information received from a document creator such as a scanner or a computer workstation. The document creator provides an image defined in colorimetric terms, typically digital in nature R, G, B. Commonly this description may be part of a Page Description Language (PDL) file describing the document. In the case of computer generated images, colors defined by the user at a user interface of a workstation can be defined initially in a color space of tristimulus values. These colors are defined independently of any particular device, and accordingly reference is made to the information as being "device independent".

The printer, on the other hand, often has an output which can be defined as existing in a color space called CMYK (cyan-magenta-yellow-key or black) which is uniquely defined for the printer by its capabilities and colorants as well as the media upon which the printer deposits ink. Printers operate by the addition of overlapping multiple layers of ink or colorant in layers to a page or by the adjacent deposition of colorants. The response of the printer tends to be relatively non-linear. These colors are defined for a particular device, and accordingly reference is made to the information as being "device dependent". Thus, while a printer receives information in a device independent color space, the information must be converted to print in a device dependent color space, which reflects a possible range of colors of the printer, and secondly, printing of that image with a color printer in accordance with the colors defined by the scanner or computer generated image.

The perceived color of the image is determined not only by the relative amounts of each colorant put down on the recording medium, but also by the order in which the colorants are printed and the media type. Consequently, there are a multitude of variables which affects a final printed image. To accurately reproduce an original image, therefore, requires a transformation from a device independent color space to a multitude of device dependent color spaces, each one being determined, at least in part by, the combined effects of colorant, image density, media type, and print speed.

Various color printing systems and methods for printing color images on a recording medium are illustrated and described in the following disclosures which may be relevant to certain aspects of the present invention.

U.S. Pat. No. 4,275,413 to Sakamoto et al. describes a linear interpolating method and apparatus for color signals in a memory of a picture reproducing machine such as a color scanner, a color facsimile producer, or the like. The linear interpolating method for signals in the memory is used for color correction of pictures in the reproducing machine.

U.S. Pat. No. 5,664,072 to Ueda et al. describes a color conversion device wherein color value data including data for outputting color images inputted to a CPU. A color conversion means may preferably convert the set of input-color data into the set of print control data, while correcting the distortion in the uniform color space in regards to human visual sense.

"Digital Computation of Dot Areas in a Colour Scanner", pages 93–96, Korman and Yule, Proceedings of the Eleventh International Conference of Printing Research Institute, Canandaigua, N.Y., 1971, describes a method of computing the dot areas required for accurate colour reproduction suitable for use in a color scanner with a digital computer.

SUMMARY OF THE INVENTION

In accordance with one aspect of the present invention, there is provided a memory-saving printer driver for controlling output image aspects and quality in a color printer. The memory-saving printer driver itself includes a User Interface segment having a graphical display for selecting output image aspects. The graphical display includes a media type portion for selecting a desired one of a first plural number "M" of different media types for printing an output image thereon, and a lookup table segment storing a second plural number "N" of media-type basis color correction lookup tables for making color corrections on output images to be printed on each media type selected from the media portion. Each media-type basis color correction lookup table of the second plural number "N" is mapped for making corrections on each of a third plural and variable number "K" of different media types of the first plural number "M", wherein "K" is one of a series of subsets of the first plural number "M", thereby resulting in the second plural number "N" being less than the first plural number "M", and in significant savings in lookup table storage memory.

In accordance with another aspect of the present invention, there is provided a color printer including a printhead for printing color images on a selected medium from the plurality of different media types, and memory-saving printer driver for controlling output image aspects and quality in the color printer. The memory-saving printer driver itself includes a User Interface segment having a graphical display for selecting output image aspects. The graphical display includes a media type portion for selecting a desired one of a first plural number "M" of different media types for printing an output image thereon, and a lookup table segment storing a second plural number "N" of media-type basis color correction lookup tables for making color corrections on output images to be printed on each media type selected from the media portion. Each media-type basis color correction lookup table of the second plural number "N" is mapped for making corrections on each of a third plural and variable number "K" of different media types of the first plural number "M", wherein "K" is one of a series of subsets of the first plural number "M", thereby resulting in the second plural number "N" being less than the first plural number "M", and in significant savings in lookup table storage memory.

In accordance with yet another aspect of the present invention, there is provided a color printing system for printing quality color images on a medium selected from a plurality of different media types. The color printing system includes a color document source; a color printer including a printhead for printing color images on a selected medium from the plurality of different media types, and memory-saving printer driver for controlling output image aspects and quality in the color printer. The memory-saving printer driver itself includes a User Interface segment having a graphical display for selecting output image aspects. The graphical display includes a media type portion for selecting a desired one of a first plural number "M" of different media types for printing an output image thereon, and a lookup table segment storing a second plural number "N" of media-type basis color correction lookup tables for making color corrections on output images to be printed on each media type selected from the media portion. Each media-type basis color correction lookup table of the second plural number "N" is mapped for making corrections on each of a third plural and variable number "K" of different media types of the first plural number "M", wherein "K" is one of a series of subsets of the first plural number "M", thereby resulting in the second plural number "N" being less than the first plural number "M", and in significant savings in lookup table storage memory.

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
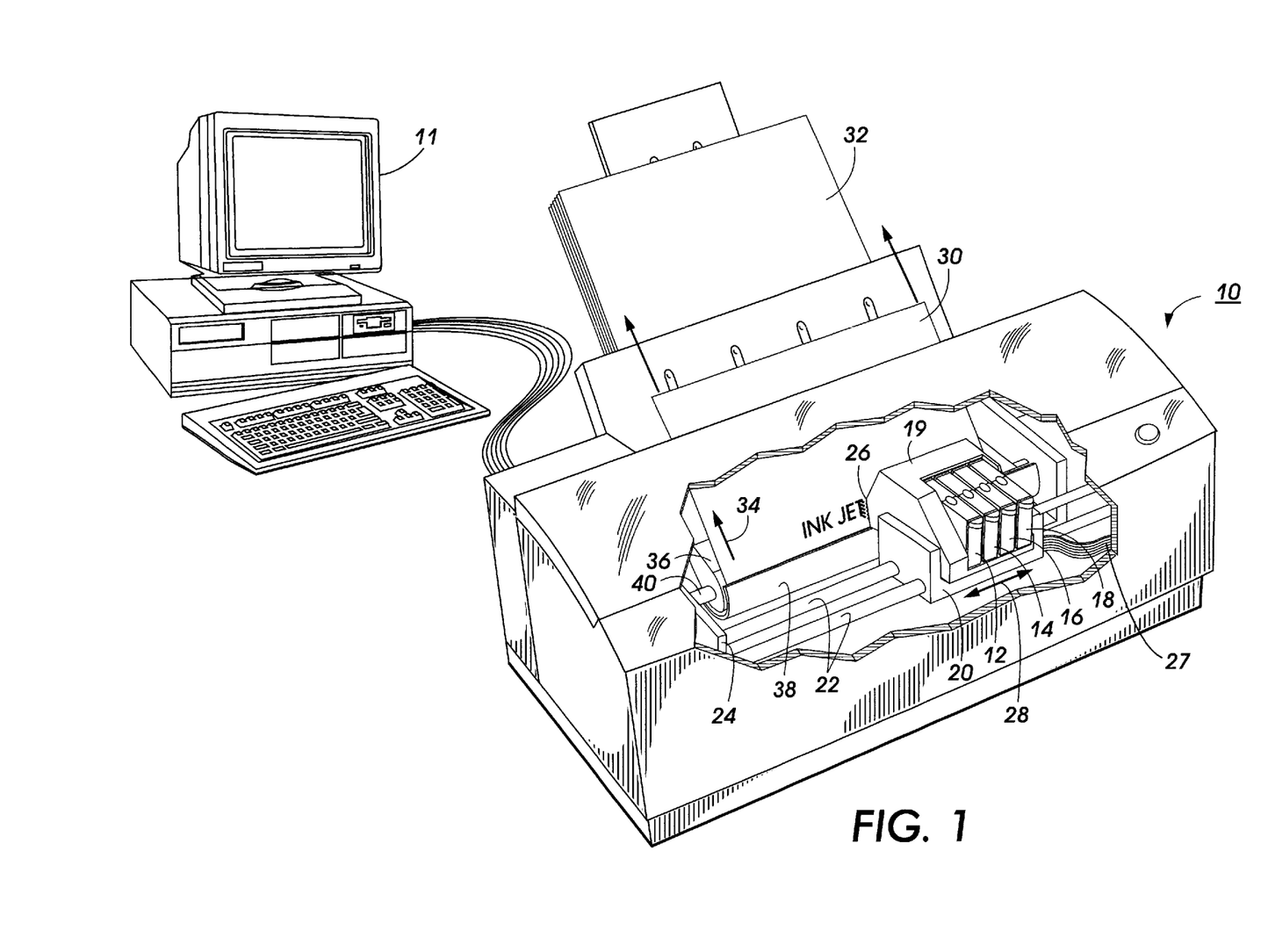
FIG. 1 illustrates a perspective view of a color ink jet printing system incorporating printer and driver of the present invention.

FIG. 1 illustrates a perspective view of a color printing system including a color printer such as a color thermal ink jet printer 10. Printer 10 is exemplary only. The invention can be practiced in other types of thermal ink jet printers, as well as other reproduction devices including liquid ink printers driven by signals from a document source, such as a document raster input scanner or a personal computer 11. Printer 10 includes four ink jet ink containers 12, 14, 16, and 18 mounted in a print cartridge 19 on a carriage 20 supported by carriage rails 22. The carriage rails 22 are supported by a frame 24 of the ink jet printer 10. The printhead cartridge, which comprises the ink containers, contain ink for supply to one or more thermal ink jet printheads 26 which selectively expel droplets of ink under control of electrical signals received from a controller (not shown) of the printer 10 through an electrical cable 27. The printhead 26 contains a plurality of ink channels which carry ink from one or more of the ink containers 12, 14, 16, and 18 to respective ink ejecting orifices or nozzles of the printhead 26.

When printing, the carriage 20 reciprocates or scans back and forth along the carriage rails 22 in the direction of an arrow 28. As the printhead 26 reciprocates back and forth across a recording medium 30, fed from an input stack 32 containing, for instance, sheets of paper or transparencies, droplets of ink are expelled from selected ones of the printhead nozzles towards the recording medium 30. The ink ejecting orifices or nozzles are typically arranged in a linear array substantially perpendicular to the scanning direction 28 and consequently images are created line by line in multiple swaths of the printhead. In page width printers a single line of information crosses substantially the entire width or length of the recording medium.

When printing in color, such a linear array can be segmented such that segments of the array deposit different colors of ink to complete a color image. It is also possible that each of the ink tanks be connected to or include an individual linear nozzle array such that the printer includes four linear arrays, one for each ink. Combinations of segmented arrays and individual arrays are also possible. During each pass of the carriage 20, the recording medium 30 is held in a stationary position. At the end of each pass, the recording medium is stepped in the direction of an arrow 34. For a more detailed explanation of the printhead and printing thereby refer to U.S. Pat. No. 4,571,599 and U.S. Pat. No. Re. 32,572, the relevant portions of which are incorporated herein by reference.

The single recording sheet or medium 30 is fed from the input stack through the printer along a path defined by a curved platen 36 and a guide member 38. The sheet 30 is driven along the path by a transport roller 40 as is understood by those skilled in the art or, for instance, as illustrated in U.S. Pat. No. 5,534,902, herein incorporated by reference. As the recording medium 30 exits the slot between the platen 36 and guide member 38, the sheet 30 is caused to reverse bow such that the sheet is supported by the platen 36 at a flat portion thereof for printing by the printheads 26.

To print color images received from a document source or creator, such as the personal computer 11, the image must be converted from an image defined in colorimetric terms, R, G and B electronic signals, which are typically digital in nature, to an output which is typically defined as existing in a color space of CMY and K electronic signals. To make such a conversion, the original color space must be transformed to the printer color space such that the resulting printed output reproduces the original image in a desired fashion.

Figure 2:
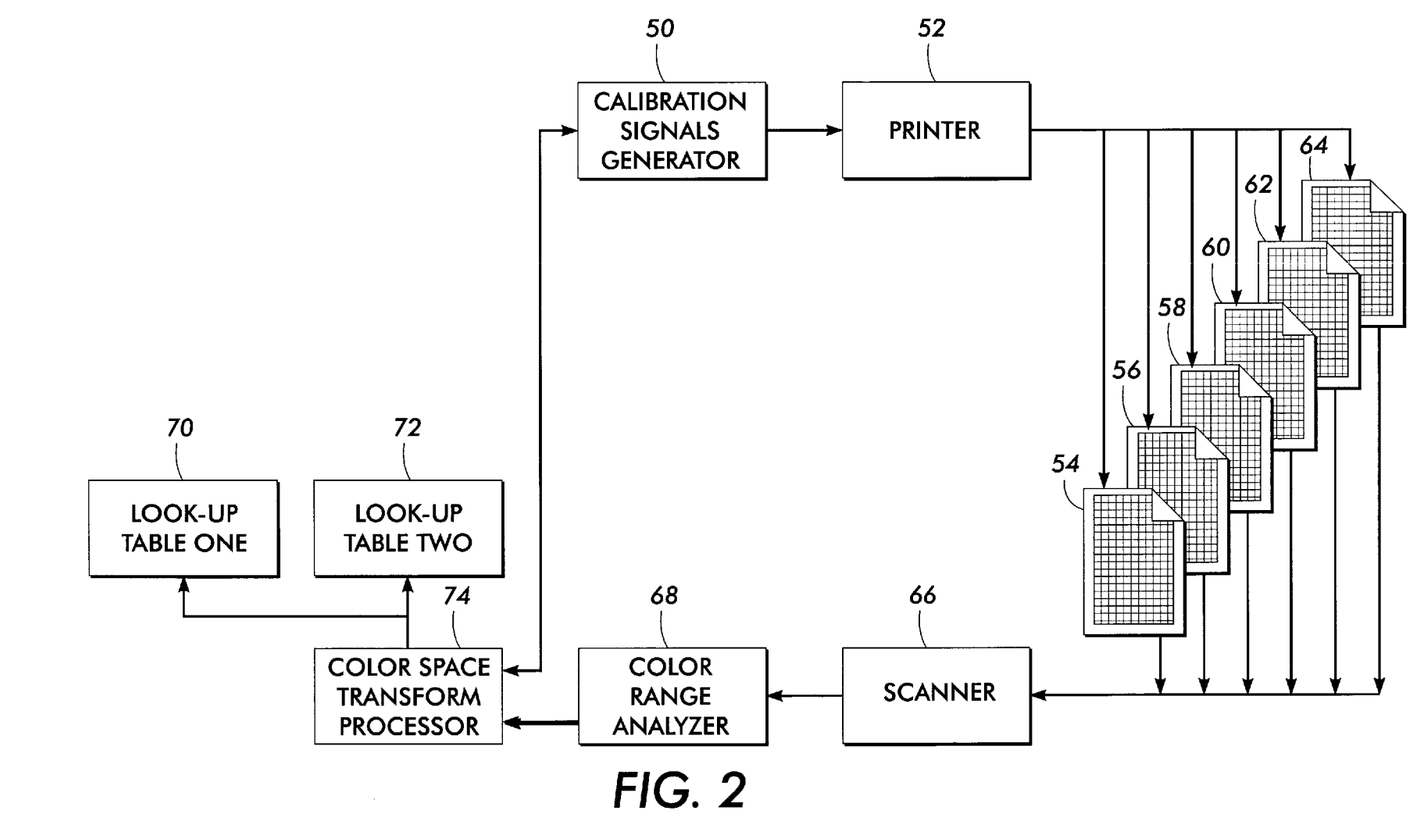
FIG. 2. illustrates a schematic block diagram illustrating a method of generating a memory-saving printer driver having a minimized number of color correction lookup tables, in accordance with the present invention.

FIG. 2 illustrates one aspect of the present invention for generating a memory-saving printer driver including a minimized number of color correction lookup tables. In order to convert from one color space to another, a calibration signal generator 50 develops a number of calibration signals for causing a printer 52 to generate a plurality of color calibration test sheets 54, 56, 58, 60, 62, and 64. Each of the calibration test sheets are generated by printing a large number, on the order of 1,000 (10 cyan densities by 10 magenta densities by 10 yellow densities) patches of colors distributed throughout printer color space for each of a plurality of media types which will be used in the printer of FIG. 1. These media types include plain paper, premium coated paper, transparency, high resolution paper, high resolution glossy paper, and transfer media. Other CMY combinations of interest, for instance, skin tones, preferred graphics tones, or other memory colors may also be included.

Once each of the color calibration test sheets has been completed, the colors of each of the patches of colors within a single test sheet are measured, with calorimeter 66, such as a spectrophotometer or a densitometer, to determine the characteristics of the colors generated on the test sheets in terms of R, B, and G. These values are then input into a color range analyzer 68 which generates a graphical representation of the dynamic color range of the deposited inks for each of the test sheets 54 through 64.

Conventionally, in order to achieve good printer output image quality, an ink jet printer conventionally included at least one color correction lookup table (LUT) for each of the media types. It has been found, however, that in such printers the amount of memory space available for all of the lookup tables may be insufficient for all such lookup tables due to certain design constraints. This is particularly true when one considers that while the ink characteristics create a real color gamut, the range of the desirable color attribute, such as chroma or hue, is limited by the media where each media may limit the range in a different fashion.

In addition, chroma or hue is often manipulated in order to change the appearance of the output images depending on the type of image being recorded. For instance, a photographic image is typically printed with a different chroma or hue than a graphics image. Consequently, when one considers the number of available print media in an ink jet printer environment as well as the variety of images and types of images being printed thereby, the amount of memory space required for the storage of the conventionally generated color correction tables becomes extremely large. Therefore, the present invention advantageously is directed to a memory-saving printer driver having a minimized the number of color correction tables for generating quality images printed by a liquid ink printer.

Figure 3:
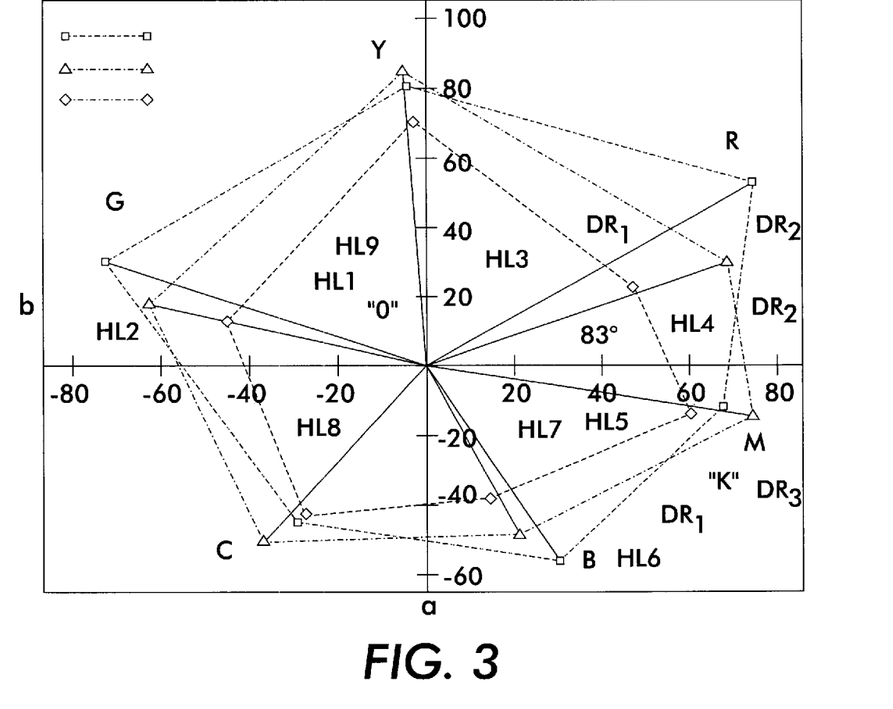
FIG. 3. illustrates graphically a chromaticity diagram showing hue lines and dynamic color range in CIE L*ab space for a plural number of different media types.
Figure 4:
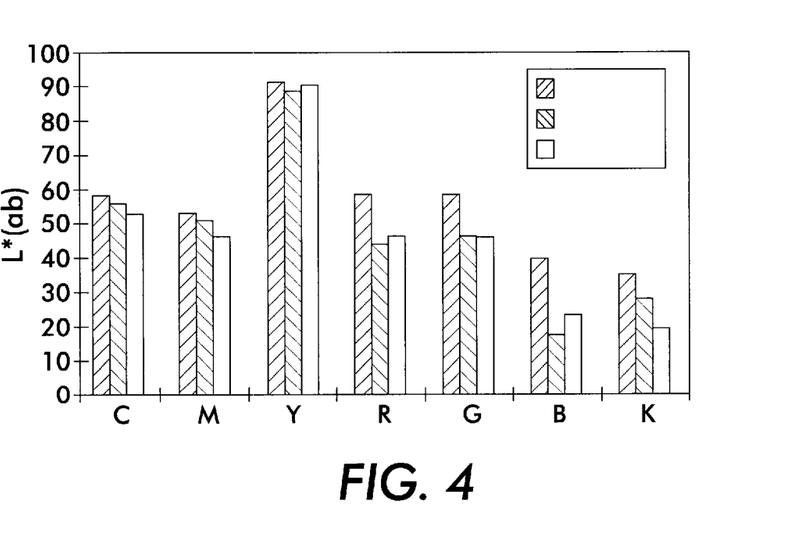
FIG. 4 illustrates graphically lightness change for the different media types of FIG. 3.

In one example, the color range analyzer 68 was used for generating values for a color range plot as illustrated in chromaticity diagram of FIG. 3. Three different media types, LX image series paper, matted paper, and glossy media, for example, were deposited with the standard test patterns. The dynamic color range values were plotted and then compared in CIE L*ab space in order to see how each primary color (RBG and CMY) shift varied for each of the different media types. The color value measurements where done using X-RITE 938 spectrophotometer under illuminate D50 and 2 degree observer. The dynamic color range plot, as illustrated in FIG. 3, indicates that of the various hue lines HL1, HL2, HL3, HL4, HL5, HL6, HL7, HL8 and HL9, HL5, HL8 and HL9 for the primary colors, CMY, are substantially common or coincident for a subset "k" of the "M" media types (where "k" is a variable number greater than 1). This means that these colors have substantially the same hue angle 83 on each of these different media types. The dynamic color range plot, as illustrated in FIG. 3 also indicates that there is a small amount of color shift in the secondary primary colors RGB as shown by the hue lines HL1, HL3 and HL6. Three dimensional modeling was also performed. In addition, it has been found that a change in the dynamic range among the three media types occurred as illustrated in FIG. 4.

Figure 6:
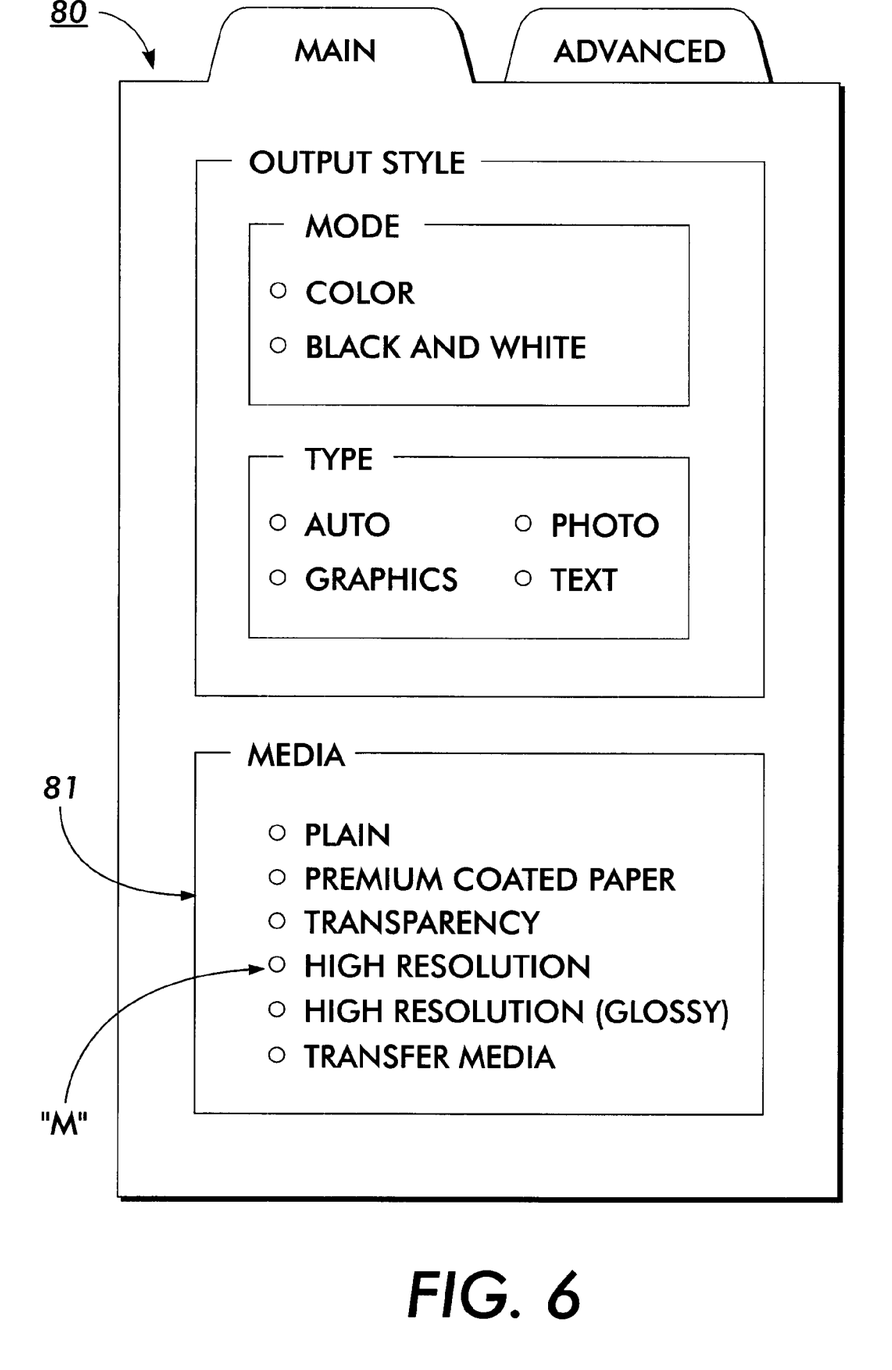
FIG. 6 illustrates a detail of the User Interface of FIG. 5 for use in the present invention.

To further determine the impact on the maximum range of color gamut, three different color correction lookup tables were generated using tetrahedral interpolation and normalized tone reproduction curve (TRC) techniques. Specifically, it was found that the lookup table for plain paper included a gamut mapping problem because of limited dynamic range with a maximum density of approximately less than 1.2, resulting in images looking darker and showing a loss of detail in shadows. Based on these results, it was found that there were cases in which the chroma or hue is substantially constant and only the dynamic ranges $DR_i$ changed for a subset "k" (FIG. 3) of the different media types "M" (FIG.6). Here DR stands for Dynamic Range; and i=1, 2, ..., k--1 for the subset "k" of media types lying on a common hue line, such HL5 (FIG.3). Similar subsets "k" (FIG. 3) can be found on hue lines HL5, HL8, HL2, HL9 and HL4. In each case, the dynamic color ranges $DR_1$, $DR_2$ ..., $DR_{k-1}$, among the "k" different types of media on the hue line, increases from $DR_1$ nearest the center "0" of the diagram to $DR_{k-1}$ furthest away from such center. The Dynamic Range $DR_i$ refers to a three dimensional color gamut volume. We can also describe the dynamic range using the 2-Dimensional chroma diagram (FIG. 3) and the lightness diagram (FIG. 4). Often the dynamic ranges for different media types can be described as the chroma difference and lightness difference. In FIG. 3, $DR_3$ has a bigger chroma value than $DR_1$. In FIG. 4, $L_3^*$ has a bigger(lower) lightness than $L_1^*$.

Consequently, a selection was made as a function of which of the media maximizes the dynamic range of ink and at the same time does not sacrifice any gamut. If an obvious color shift occurs in different media, however, the color output can be adjusted without changing the three-dimensional color correction lookup table but instead by adjusting the TRC of the color shifted. As a result, in this example, the glossy paper LUT and the matte paper LUT were applied to the image and recorded on plain paper. The print quality of both LUT's was found to be better than that of the plain paper LUT specifically in the dark color and shadow regions.

Thus it was found that for the subset "k" of different media types where there Is not much color shift, a common lookup table generated for all the "k" media types using data from that one of the subset "k" media types having the greatest dynamic color range of $DR_{k-1}$. In order words, where "k" is two, as on HL4, then a common lookup table generated using data from the media having $DR_2$ (which is greater than $DR_1$) will be used for both media types on that hue line. Where "k" is three, a common lookup table generated using data from the media type having a dynamic color range of $DR_2$, will be mapped and used for the $DR_2$ and $DR_1$ media types. Similarly, a common lookup table using data from the $DR_3$ media type, can be mapped and used for $DR_1$, $DR_2$ and $DR_3$. In general therefore, each media-type basis color correction lookup table for each of the plural and variable number "K" of different media type subsets is developed from color correction data for one of the plural and variable number "K" having a color saturation dynamic range of at least greater than $DR_2$. As such, a memory-saving printer driver can be created in accordance with the present invention, having a minimized number "N" of color correction lookup tables as above such that "N" is significantly less than "M". Therefore, for any given plural number "M" of different media types (where different subsets "k" of the number "M" each have a common or coincident hue line), using a common lookup table for the subset "k" (where "k" is greater than 1), clearly minimizes the number "N" of lookup tables required, and hence reduces the amount of printer or system memory required for storing color correction lookup table.

The present apparatus and method was also compared with the L* compression technique. While there is a color shift towards yellow when the L* compression is applied using a plain paper lookup table on plain paper, a glossy lookup table used on plain paper minimized saturation loss and efficiently mapped shadow regions and dark colors. Because the color correction tables were generated using lookup tables having a larger color range, the shadow detail and dark color information are obtained without any compression techniques. In addition to providing an efficient way to minimize the memory space in the printer driver and to solve gamut mapping problems in the shadow region, the present method and apparatus is useful with any printer or copier that includes different color ranges for different media. Specifically, the printer that has a small dynamic range on plain paper can be calibrated using the calibration design for the special media that maximizes the color gamut dynamic range.

Returning now to FIG. 2, based upon the results of the color range analyzer 68, a minimized number of lookup tables, the lookup table 70 and a lookup table 72 are generated by a color space transform processor 74 operating in conjunction with the calibration signal generator 50 as would be understood by one skilled in the art.

While FIG. 2 generally illustrates the process of generating a minimized number of lookup tables, it has been determined that the amount of ink deposited on each of the media as well as the desired output image characteristics enters into the generation and selection of the lookup tables.

For instance, it has been determined that the lookup table 70 is sufficient for printing upon the transparency paper, the high resolution paper, and the high resolution paper (glossy) and that the lookup table 72 is sufficient for printing on the plain paper, the premium coated paper, and the transfer media as long as a single type of image is printed. This initial characterization of the six media into two groups of media depends, in part, on the amount of ink necessary to be deposited on the respective media. However, once different types of images are considered, for instance photographic images versus graphic images, each of these types of images require different lookup tables. This is because in certain types of ink jet printers the end user or customer prefers a different look for photographs as compared to the look for graphics. Therefore, in general, if the media require the same amount of ink to generate an image then those types of media might share the same lookup table. Then a separate lookup table is generated for each type of image. Consequently, for the present invention, two lookup tables are contemplated for each media group, one being for graphics images and the other being for photographic images.

Figure 5:
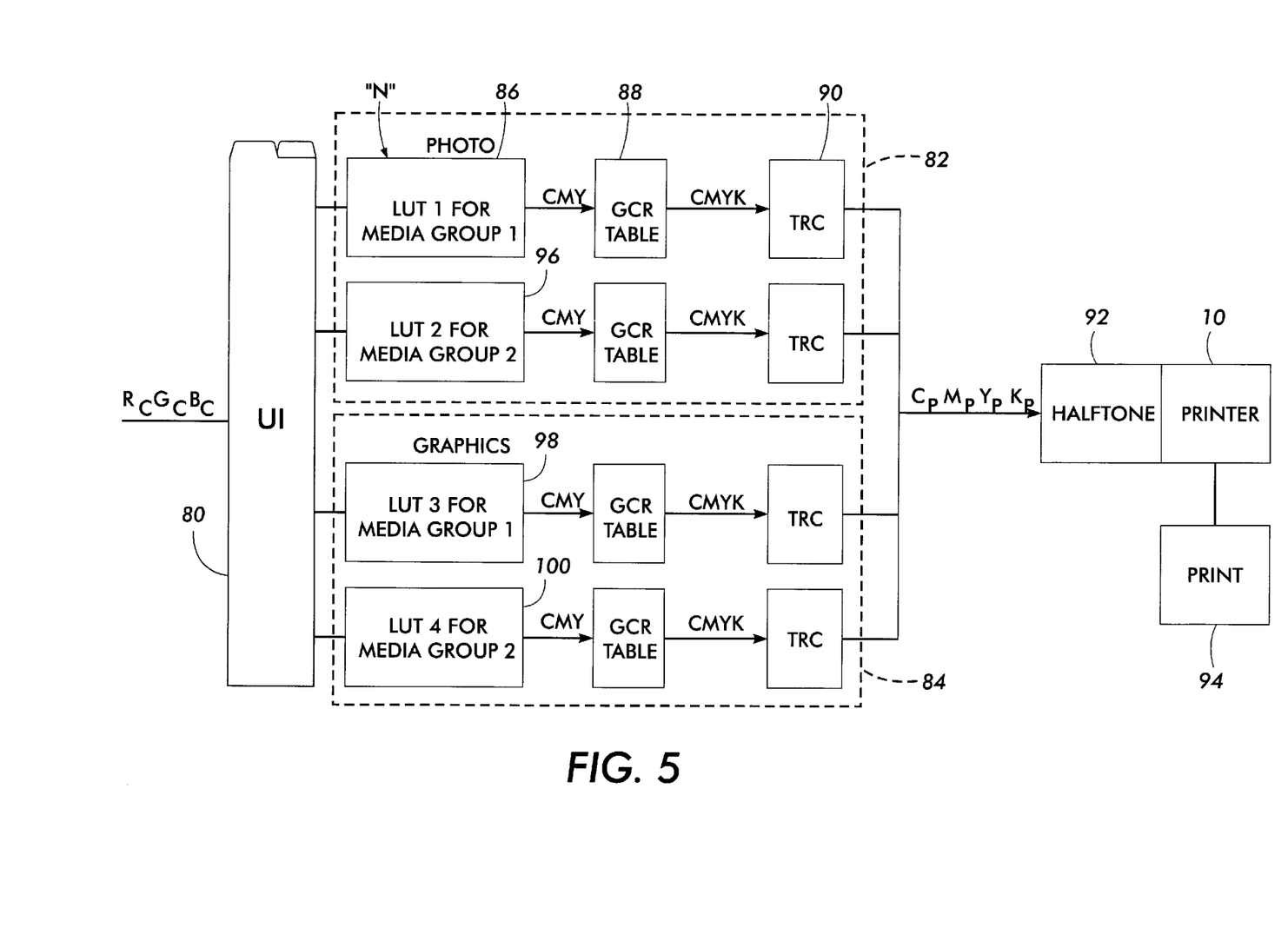
FIG. 5 illustrates a schematic circuit diagram of the printer driver of the present invention including a User Interface segment and a minimized number of color correction lookup tables segment.

FIG. 5 is a schematic block diagram illustrating a control arrangement or printer driver of the present invention suitable for use in a color printer such as the ink jet printer and system as illustrated in FIG. 1. The document source device or creator 11 of FIG. 1, a scanner, or a computer work station, generates a color image defined in colorimetric terms, typically digital in nature are Rc, Gc, and Bc. Typically, this description of the image may be part of a page description language file describing the document in device independent terms. For instance, a PDL file is received either by the printer itself having a printer driver included therein or is received by a printer driver stored in a personal computer associated with the printer being used. Once the image has been generated in RGB terms, a user typically selects from a user interface 80 (see also FIG. 6), also included in the printer driver, a media type, for instance, including the six previously mentioned media types as well as an output style including a mode of either color or black and white and an image type such as auto (automatic), graphics, photo, or text.

In automatic mode the print driver selects the appropriate LUT for determined image types, while for the remaining three, the user can select the output style. Once an output style as well as a media type have been selected, the RGB image is converted to a CMY K image for printing by the printer 10. Included in the printer driver are a photo portion 82 and a graphics portion 84 as well as additional portions, for instance, a text portion (not illustrated), for performing the necessary conversion. Assuming that the output style selected is a color image of a photo type, then the photo portion 82 would be selected by appropriate control software resident in a printer controller such as those known by those skilled in the art. If a media type is selected from the group of media group one, then a lookup table one for media group one 86 is accessed by the printer controller and the RGB signals are processed to generate address entries to the table 86 which stores a set of coefficients with which the Rc, Gc, and Bc, digital signals may be processed to convert them to CMY colorant signals. The values which are not mapped maybe determined through interpolation.

There are many methods of providing a transform from device independent data to device dependent data, with U.S. Pat. No, 4,275,413 to Sakamoto describing one method, which itself can be varied. Once a conversation table is established, a method of interpolation referred to as Tri- Linear or cubic interpolation may also be used to calculate output values from the limited set of input values.

Upon obtaining device dependent colorant signals CMY, black addition (K plus) is performed by input to a gray component replacement table 88 the output of which is CMY and K. This step is also known as under color removal and is usually dependent upon the minimum density of the CMY signals. Alternatively, it is possible to combine the black addition and under color removal with the color correction process of the lookup table one by using a three dimensional lookup table containing values for all four colorants. Once the CMY and K signals have been generated by GCR table 88, the tone or lightness is adjusted by modification with a tone reproduction curve table 90 as is known by those skilled in the art. After the application of the tone reproduction curve at the TRC 90, a Cp, Mp, Yp and Kp signal, the output of the photo adjust 82 is transmitted to a halftone processor 92 to provide half-toning which reduces the number of bits describing the density of each pixel to a number of levels reproducible on the printer 10. Applicable half-toning processes are described in, for example, U.S. Pat. No. 4,149,194 to Holladay. The printer 10 then receives the halftone CMY and K signal to generate the final printed output at prints 94.

If a user had selected from the main menu the photo image type but had instead selected a media from the media group two, the printer driver would have selected a lookup table two 96 for generating the appropriate printed output. The processing would proceed as described previously for the lookup table 86. If however the graphic image type had been selected, the graphic portion 84 of the printer driver would either select a lookup table 98 or a lookup table four 100 depending on the type of media selected. For any of the lookup tables one through four, the selected lookup table provides a reasonably accurate reproduction of the RGB signals input thereto such that a minimized number of lookup tables have been generated while still maintaining a reasonable print quality at the print 94. Consequently, a reduced amount of memory space is necessary for storage of the lookup tables. It will no doubt be appreciated, that the invention can be accomplished with a hardware logic implementation thereof, or a software implementation on a programmable processing device, or a combination of hardware and software.

In recapitulation, there is provided a memory-saving printer driver (FIGS. 5 and 6) for controlling output image aspects and quality in a color printer. The memory-saving printer driver itself includes a User Interface segment 80 having a graphical display for selecting output image aspects. The graphical display includes a media type portion 81 for selecting a desired one of a plural number "M" of different media types for printing an output image thereon, and a lookup table segment (FIG. 5) storing a plural number "N" of media-type basis color correction lookup tables (86, 96, 98 and 100) for making color corrections on output images to be printed on each media type selected from the media portion. Each media-type basis color correction lookup table of the plural number "N" is mapped for making corrections on each of a plural and variable number "K" (FIG. 3) of different media types of the plural number "M" having a common hue angle, wherein "K" is one of a series of subsets of the plural number "M". The result is a plural number "N" that is less than the plural number "M", and significant savings in lookup table storage memory.

There is also provided a color printer including a printhead for printing color images on a selected medium from the plurality of different media types, and a memory-saving printer driver (FIGS. 5 and 6) for controlling output image aspects and quality in a color printer. The memory-saving printer driver itself includes a User Interface segment 80 having a graphical display for selecting output image aspects. The graphical display includes a media type portion 81 for selecting a desired one of a plural number "M" of different media types for printing an output image thereon, and a lookup table segment (FIG. 5) storing a plural number "N" of media-type basis color correction lookup tables (86, 96, 98 and 100) for making color corrections on output images to be printed on each media type selected from the media portion. Each media-type basis color correction lookup table of the plural number "N" is mapped for making corrections on each of a plural and variable number "K" (FIG. 3) of different media types of the plural number "M" having a common hue angle, wherein "K" is one of a series of subsets of the plural number "M". The result is a plural number "N" that is less than the plural number "M", and significant savings in lookup table storage memory.

There is further provided, a color printing system for printing quality color images on a medium selected from a plurality "M" of different media types. The color printing system includes a color document source 11; a color printer 10 including a printhead 19 for printing color images on a selected medium from the plurality of different media types, and a memory-saving printer driver (FIGS. 5 and 6) for controlling output image aspects and quality in a color printer. The memory-saving printer driver itself includes a User Interface segment 80 having a graphical display for selecting output image aspects. The graphical display includes a media type portion 81 for selecting a desired one of a plural number "M" of different media types for printing an output image thereon, and a lookup table segment (FIG. 5) storing a plural number "N" of media-type basis color correction lookup tables (86, 96, 98 and 100) for making color corrections on output images to be printed on each media type selected from the media portion. Each media-type basis color correction lookup table of the plural number "N" is mapped for making corrections on each of a plural and variable number "K" (FIG. 3) of different media types of the plural number "M" having a common hue angle, wherein "K" is one of a series of subsets of the plural number "M". The result is a plural number "N" that is less than the plural number "M", and significant savings in lookup table storage memory.

While the present invention has been described with respect to a specific embodiment thereof, it is evident that many alternatives, modifications, and variations will be apparent to those skilled in the art. Accordingly, it is intended to embrace all such alternatives, modifications, and variations that fall within the spirit and broad scope of the appended claims.

What is claimed is:

1. A memory-saving printer driver for controlling output image aspects and quality in a color printer, the memory-saving printer driver comprising:
    (a) a user Interface segment comprising a graphical display for selecting output image aspects, said graphical display having a media type portion for selecting a desired one of a plural number "M" of different media types for printing an output image thereon; and
    (b) a lookup table segment storing a plural number "N" of media-type basis color correction lookup tables for making color corrections on output images to be printed on each media type selected from said media type portion, each media-type basis color correction lookup table of said plural number "N" thereof being mapped for making corrections on each of a plural and variable number "K" of different media types of said plural number "M", wherein "K" is one of a series of subsets of said plural number "M", thereby resulting in said plural number "N" being less than said plural number "M", and in significant savings in lookup table storage memory.

2. The memory-saving printer driver of claim 1, wherein different media types of each one of said series of said plural and variable number "K" have (i) a substantially common hue line as graphed on a two-dimensional color chromaticity diagram for a given primary color and (ii) different color saturation dynamic ranges $DR_i$ (where i=1, 2, ..., k−1), increasing from $DR_1$, $DR_2$, to $DR_{K-1}$ and lying substantially on said substantially common hue line.

3. The memory-saving printer driver of claim 2, wherein said each media-type basis color correction lookup table for each said plural and variable number "K" of different media types is developed from color correction data for one of said plural and variable number "K" having a color saturation dynamic range at least greater than said $DR_2$.

4. A printer for printing quality color images on different media types, the printer comprising:
   (a) a printhead assembly for printing quality color images on different media types; and
   (b) a memory-saving printer driver for controlling output image aspects and quality in the printer, the memo-saving printer driver comprising:
      (i) a user Interface segment comprising a graphical display for selecting output image aspects, said graphical display having a media type portion for selecting a desired one of a plural number "M" of different media types for printing an output image thereon; and
      (ii) a lookup table segment storing a plural number "N" of media-type basis color correction lookup tables for making color corrections on output images to be printed on each media type selected from said media type portion, each media type basis color correction lookup table of said plural number "N" being mapped for making corrections on each of a plural and variable number "K" of different media types of said plural number "M", wherein "K" is one of a series of subsets of said plural number "M" thereby resulting in said plural number "N" being less than said plural number "M", and in significant savings in lookup table storage memory.

5. The printer of claim 4, wherein different media types of each one of said series of said plural and variable number "K" have (i) a substantially common hue line as graphed on a two-dimensional color chromaticity diagram for a given primary color and (ii) different color saturation dynamic ranges $DR_i$ (where i=1, 2, ..., k−1), increasing from $DR_1$, $DR_2$, to $DR_{K-1}$ and lying substantially on said substantially common hue line.

6. The printer of claim 5, wherein said each media type basis color correction lookup table for each said plural and variable number "K" of different media types is developed from color correction data for one of said plural and variable number "K" having a color saturation dynamic range at least greater than said $DR_2$.

7. A color printing system for printing quality color Images on a medium selected from a plurality of different media types, the color printing system comprising:
   (a) a color document source;
   (b) a color printer including a printhead for printing color images on the medium; and
   (c) a memory-saving printer driver for controlling output image aspects and quality in the color printer, the memory-saving printer driver comprising:
      (i) a user interface segment comprising a graphical display for selecting output image aspects, said graphical display having a media type portion for selecting a desired one of a plural number "M" of different media types for printing an output image thereon; and
      (ii) a lookup table segment storing a plural number "N" of media-type basis color correction lookup tables for making color corrections on output images to be printed on each media type selected from said media type portion, each media type basis color correction lookup table of said plural number "N" being mapped for making corrections on each of a plural and variable number "K" of different media types of said plural number "M", wherein "K" is one of a series of subsets of said plural number "M" thereby resulting in said plural number "N" being less than said plural number "M", and in significant savings in lookup table storage memory.

8. The color printing system of claim 7, wherein said document source is a personal computer.

9. The color printing system of claim 8, wherein said memory-saving printer driver is stored in said personal computer.

10. The color printing system of claim 8, wherein said memory-saving print driver includes two tone reproduction curve lookup tables, each of said tone reproduction curve lookup tables being selectable as a function of a selection of one of the plurality of different media types.

11. The color printing system of claim 8, wherein said user interface segment includes an image type selector portion for selecting one of a plurality of different image types.

12. The color printing system of claim 11, wherein said plural number "N" of said color correction lookup tables Includes a first image type color correction lookup table and a second image type color correction lookup table, each being selectable as a function of a selection of one of the plurality of different media types and as a function of the selection of one of the plurality of different image types.

13. The color printing system of claim 11, wherein said image type selector portion includes a photographic image type selection and a graphics image type selection.

* * * * *